(12) United States Patent
Carlson et al.

(10) Patent No.: US 12,097,667 B2
(45) Date of Patent: Sep. 24, 2024

(54) STRINGER FORMING APPARATUS AND METHOD

(71) Applicant: The Boeing Company, Chicago, IL (US)

(72) Inventors: Lisa Christina Carlson, Auburn, WA (US); Silas Lawton Studley, Seattle, WA (US); Daniel Saeil Martin, Stanwood, WA (US); Kurtis Shuldberg Willden, Kent, WA (US); Gagandeep Saini, Snohomish, WA (US); Steven Joseph Plummer, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/653,758

(22) Filed: Mar. 7, 2022

(65) Prior Publication Data
US 2023/0278297 A1  Sep. 7, 2023

(51) Int. Cl.
| | | |
|---|---|---|
| *B29C 33/30* | (2006.01) | |
| *B21D 28/34* | (2006.01) | |
| *B29C 70/42* | (2006.01) | |
| *B29C 70/46* | (2006.01) | |
| *B29L 31/30* | (2006.01) | |

(52) U.S. Cl.
CPC .......... *B29C 70/462* (2013.01); *B21D 28/34* (2013.01); *B29L 2031/3076* (2013.01)

(58) Field of Classification Search
CPC ..... B29C 33/307; B29C 33/30; B29C 33/306; B29C 33/305; B29C 33/301; B29C 33/0088; B29C 70/462; B29C 70/446; B29C 70/345
See application file for complete search history.

(56) References Cited

U.S. PATENT DOCUMENTS

| | | | |
|---|---|---|---|
| 5,793,015 A * | 8/1998 | Walczyk | B29C 33/3842 83/418 |
| 8,465,613 B2 | 6/2013 | Rotter et al. | |
| 9,254,619 B2 | 2/2016 | Rotter et al. | |
| 9,387,628 B2 | 7/2016 | Chapman et al. | |
| 10,377,091 B2 | 8/2019 | Carlson et al. | |
| 2006/0231981 A1 | 10/2006 | Lee et al. | |
| 2010/0102482 A1* | 4/2010 | Jones | B29C 43/58 264/320 |
| 2013/0340928 A1* | 12/2013 | Rotter | B29C 53/04 425/363 |

(Continued)

FOREIGN PATENT DOCUMENTS

EP    4035877 A1    8/2022

OTHER PUBLICATIONS

European Patent Office Extended Search Report, dated Jul. 26, 2023, regarding Application No. EP23160226.9, 7 pages.

*Primary Examiner* — Matthew J Daniels
(74) *Attorney, Agent, or Firm* — Yee & Associates, P.C.

(57) ABSTRACT

Composite laminate stiffeners such as stringers are punch formed between first and second universal dies respectively carried on first and second trays. The second tray is mounted for sliding movement relative to the first tray between a punch position and a compaction position. Parts of the first and second dies are easily reconfigurable, allowing different shapes of stiffeners to be formed on the same forming apparatus.

25 Claims, 19 Drawing Sheets

(56) References Cited

U.S. PATENT DOCUMENTS

| | | | |
|---|---|---|---|
| 2014/0103585 A1* | 4/2014 | Coxon | B29C 70/446 |
| | | | 425/389 |
| 2019/0329508 A1* | 10/2019 | Shinozaki | B29D 99/0003 |
| 2020/0231267 A1 | 7/2020 | Rotter et al. | |
| 2020/0282694 A1 | 9/2020 | Sanders et al. | |

* cited by examiner

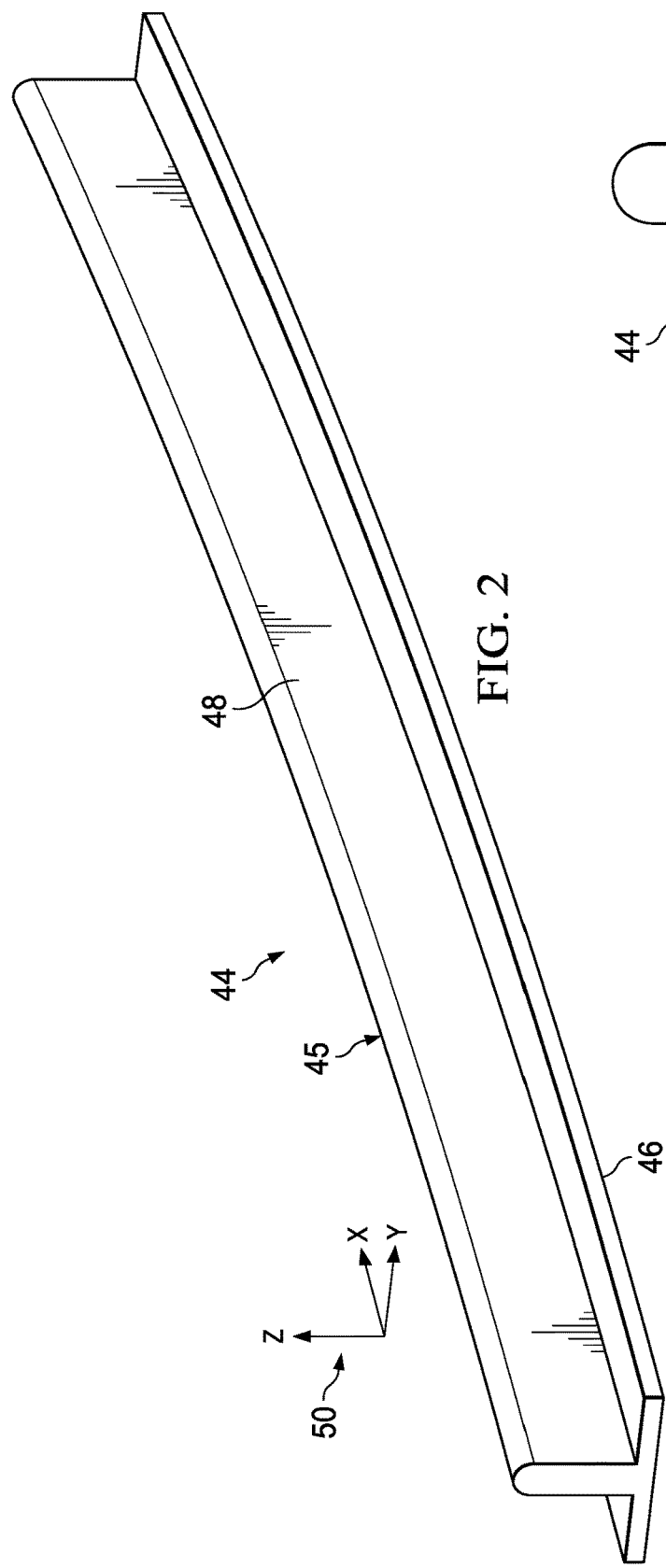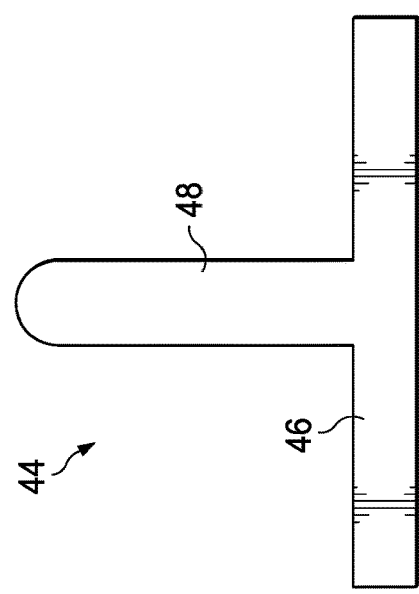

STRINGER FORMING APPARATUS AND METHOD

FIELD

The present disclosure generally relates to forming stringers such as those used to stiffen aircraft structures, and deals more particularly with a stringer forming apparatus and method.

BACKGROUND

Composite stringers such as those used in the aircraft and marine industries can be made by compression forming a flat stack of composite plies between a pair of tool dies placed in a press or similar device that compresses the dies together. Each of the dies has unique tool surfaces that are configured to produce a particular cross-sectional stringer shape. Each stringer shape therefore requires the use of dies that are unique to that shape, and cannot be used to make stringers having other shapes. The dies can be costly to manufacture, consequently, considerable expense is incurred where different sets of dies are required to produce different stringer shapes.

Producing stringers having different shapes can also be costly due to the time and labor required to change out the dies in a press. In some types of stringers, it is necessary to change parts of a die that are unique to a certain processing stage, such as compaction of parts of the stringer after it has been formed to shape. The need for changing out parts of a die further adds to the expense of the stringer manufacturing process.

Accordingly, it would be desirable to provide a stringer forming apparatus and related method that reduces the need for uniquely configured dies and die parts needed to make different stringer shapes. It would also be desirable to reduce the time and labor required to modify a forming apparatus to produce different forms of stringers.

SUMMARY

The disclosure relates in general to equipment and processes for making composite laminate parts, and more specifically to an apparatus and method of making composite laminate stringers having various shapes.

According to one aspect, a reconfigurable pallet is provided for forming composite stringers having different shapes. The pallet includes upper and lower supports that are configured to move toward and away from each other. The pallet also includes an upper die including a punch. The upper die is releasably mounted on the upper support and is configured to allow the upper die to be replaced with a different upper die. The pallet further includes a lower die mounted on the lower support. The lower die includes die block assemblies forming a die cavity into which a composite charge may be formed by the punch.

According to another aspect, apparatus is provided for punch forming a composite charge into a stringer. The apparatus includes a set of upper arms and a set of lower arms. The apparatus also includes an upper tray coupled with the upper arms. The upper tray includes a top plate and a punch. The apparatus includes a lower tray including a die having a die cavity into which the punch may form the composite charge into a stringer shape. The apparatus further includes a slide assembly mounting the lower tray on the lower arms for sliding movement between a first position in which the punch forms the composite charge into the die cavity, and a second position in which the top plate is used to compact the composite charge.

According to still another aspect, a method is provided of forming a composite stringer. The method includes placing a flat composite charge between a first die and a second die, and moving the second die to a punch forming position aligned with the first die. The method also includes a punch for forming the flat composite charge into the shape of a stringer while the second die is in the punch forming position. The method includes shifting the second die from the punch forming position to a compaction position, and compacting at least a portion of the stringer using the first die while the second die is in the compaction position.

One of the advantages of the disclosed apparatus and method is that the time and labor needed to compression form composite stringers can be reduced. Another advantage is that universal dies are provided that can easily and quickly be reconfigured to produce stringers having different cross sectional shapes. A further advantage is that the die changing process is partially automated, thereby reducing labor costs and increasing throughput.

The features, functions, and advantages can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and advantages thereof, will best be understood by reference to the following detailed description of an illustrative example of the present disclosure when read in conjunction with the accompanying drawings, wherein:

FIG. 2 is an illustration of a perspective view of a stringer.

FIG. 3 is an illustration of an end view of the stringer shown in FIG. 2.

DETAILED DESCRIPTION

Figure 1:
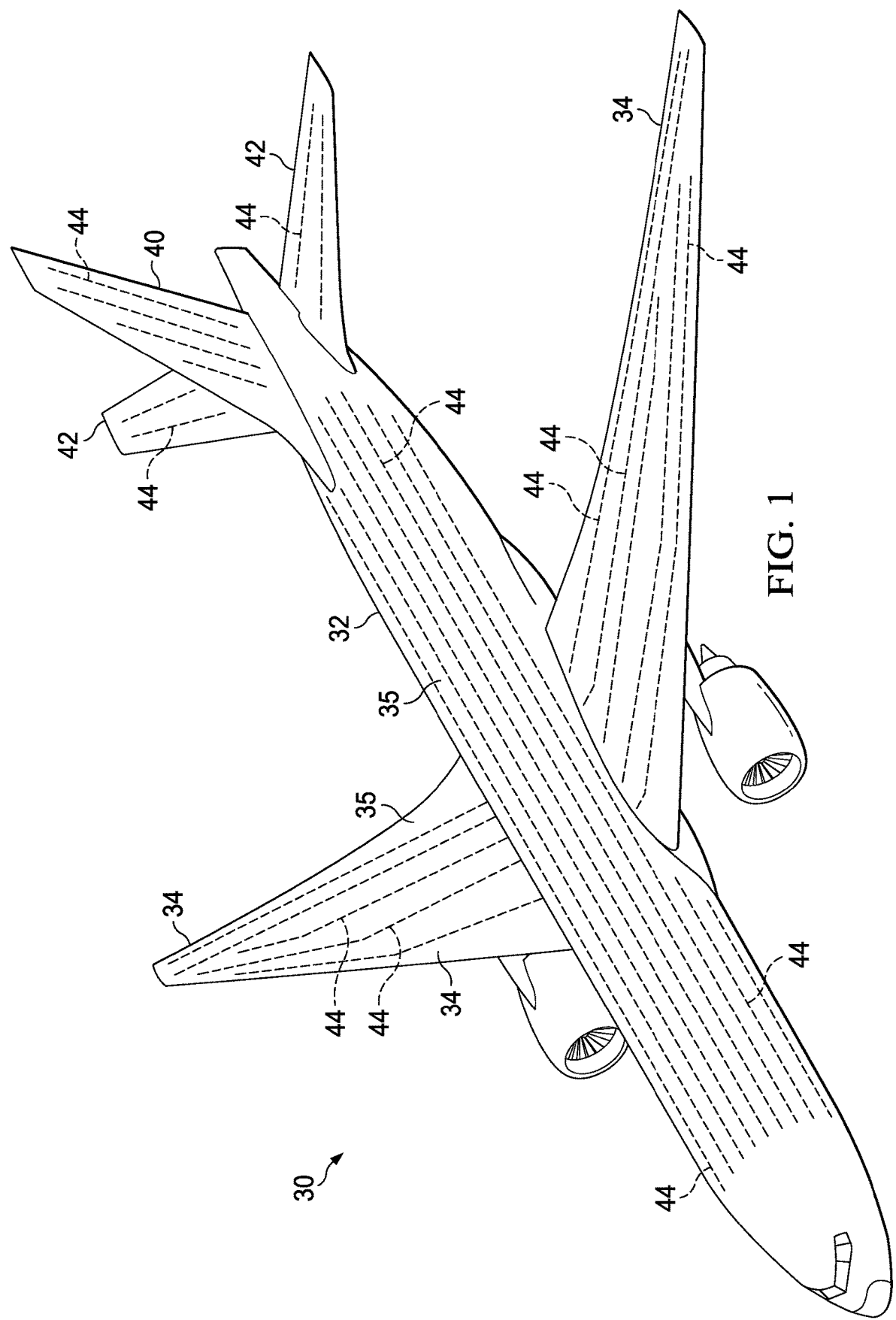
FIG. 1 is an illustration of a perspective view of an airplane, the location of stringers indicated in broken lines.
Figure 4:
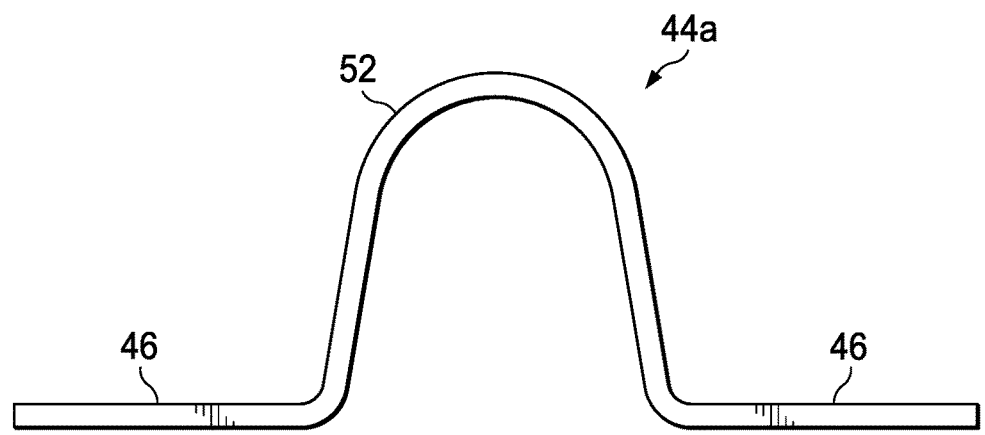
FIG. 4 is an illustration of an end view of another form of a stringer.

The disclosed embodiments relate to a method and apparatus for making composite stiffeners such as stringers used in the aircraft, marine and other industries. For example, referring to FIG. 1, an airplane 30 includes a fuselage 32, wings 34 and an empennage comprising a vertical stabilizer 40 and horizontal stabilizers 42. Each of these airframe components includes a composite outer skin 35 that is reinforced and stabilized by stringers 44 beneath the skin 35. The stringers 44 are joined to the IML (inner mold line) of the skin 35, typically by co-curing or by co-bonding. The stringers 44 may have any of a variety of cross sectional shapes depending on the application. One example of a stringer 44, sometimes referred to as a blade stringer, is shown in FIGS. 2 and 3. The blade stringer 44 includes a base 46 formed by outwardly extending flanges, and a blade 48, sometimes referred to as a web. Another example of a stringer 44a is shown in FIG. 4, commonly known as a rounded hat stringer 44a. The hat stringer 44a includes a rounded hat section 52 and a pair of outwardly extending flanges 46. The disclosed method and apparatus can be used to make the stringers 44, 44a and any of a variety of other types of stringers, such as, without limitation, I, J, Y, Z stringers as well as other forms of hat stringers.

Depending upon the application, the stringers 44 may have various out-of-plane features such as contours, pad ups and/or joggles (not shown) at one or more locations along their lengths. Contouring of the stringers 44 is sometimes necessary in order to match the contour of a skin 35 to which the stringers 44 are attached. For example, as shown in FIG. 2, the stringer 44 has a contour 45 along its entire length in the XZ plane within coordinate system shown at 50, however in other examples the stringer 44 may have straight sections as well as local contours along its length. The stringer 44 may also have one or more contours along its length in the XY plane. Each of the base 46 and the blade 48 may have a variable thickness at one or more locations along their lengths in order to conform the stringer 44 to localized features of the structure to which it is attached.

Figure 5:
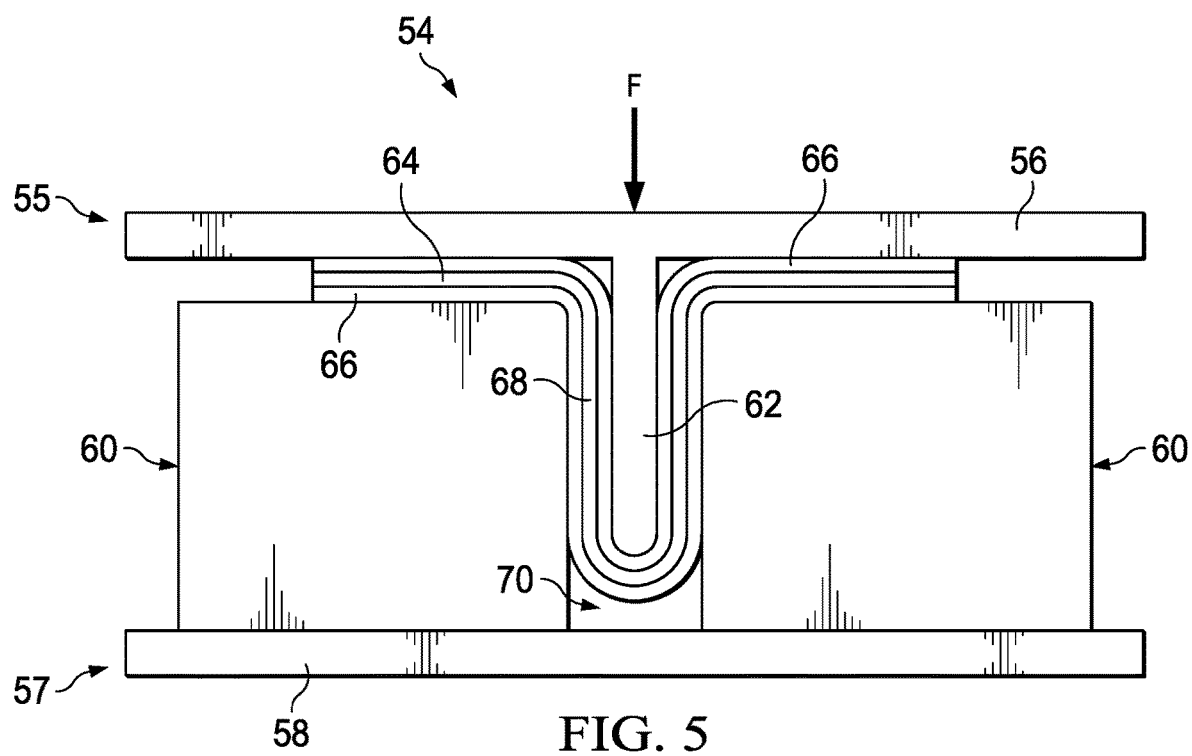
FIGS. 5-7 are illustrations of diagrammatic views of a tool set, showing the successive steps in forming a flat composite charge into the stringer shown in FIGS. 2 and 3.
Figure 6:
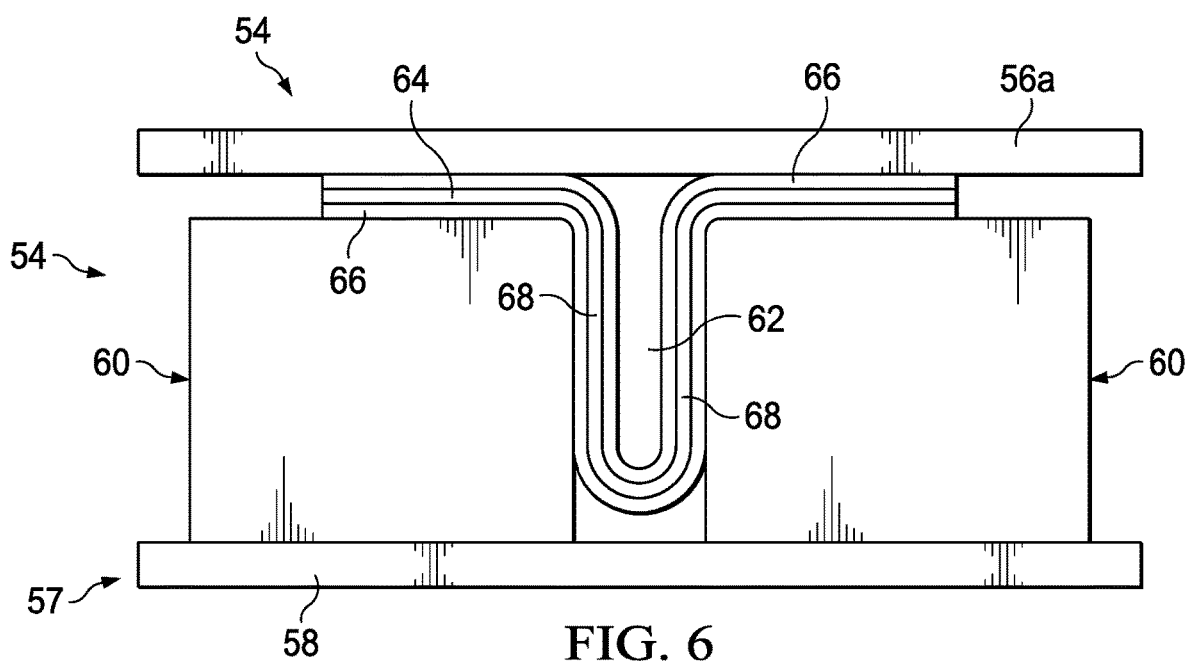
Figure 7:
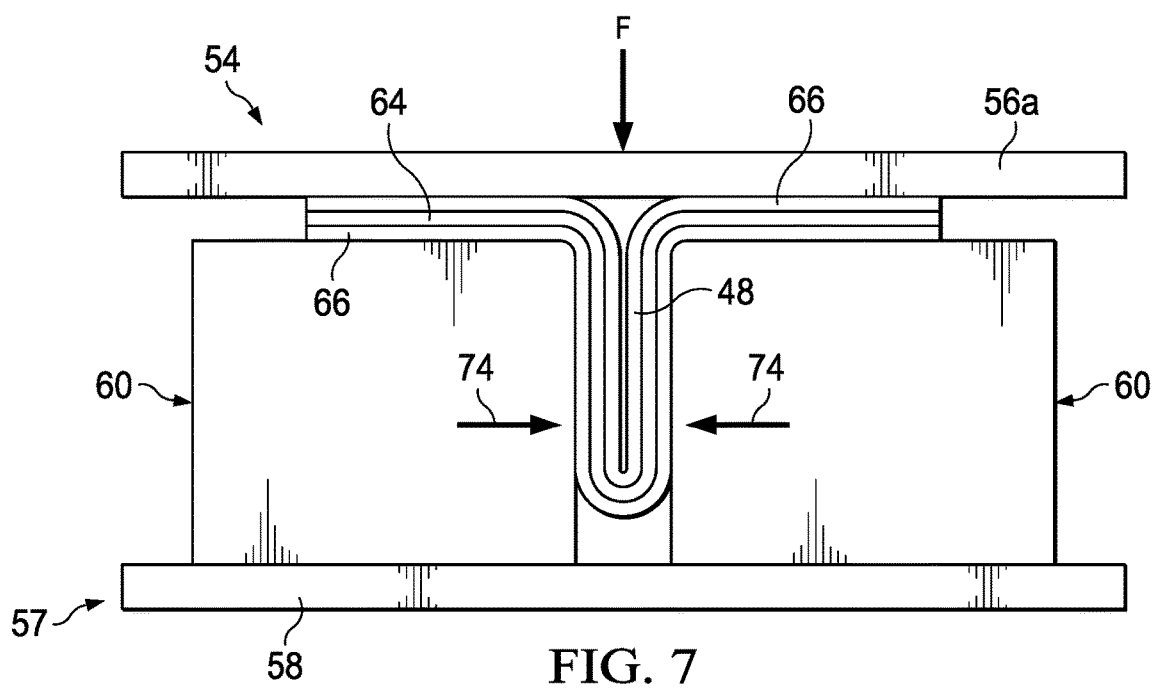
Figure 8:
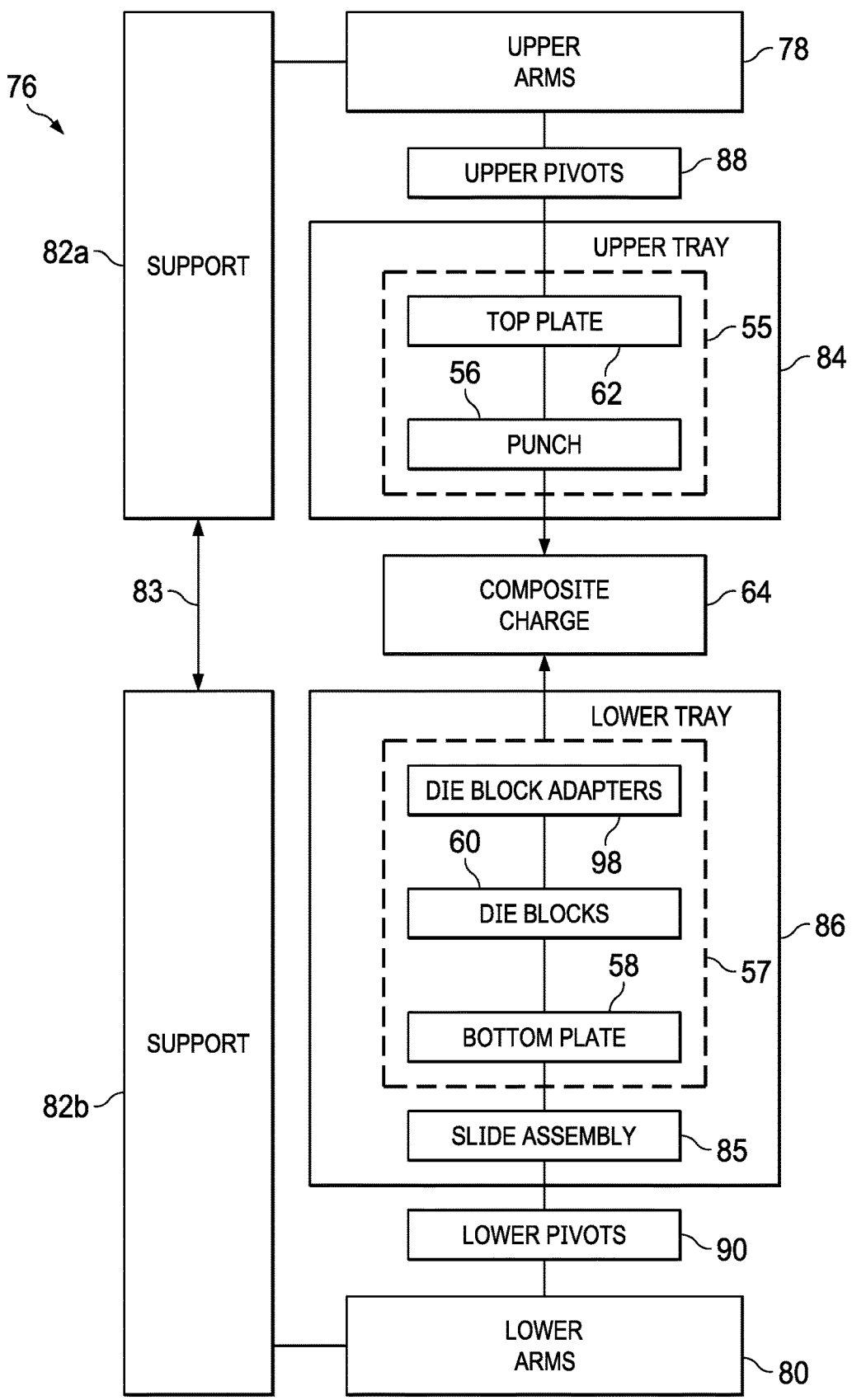
FIG. 8 is an illustration of a block diagram of a forming apparatus used to make composite stringers.
Figure 9:
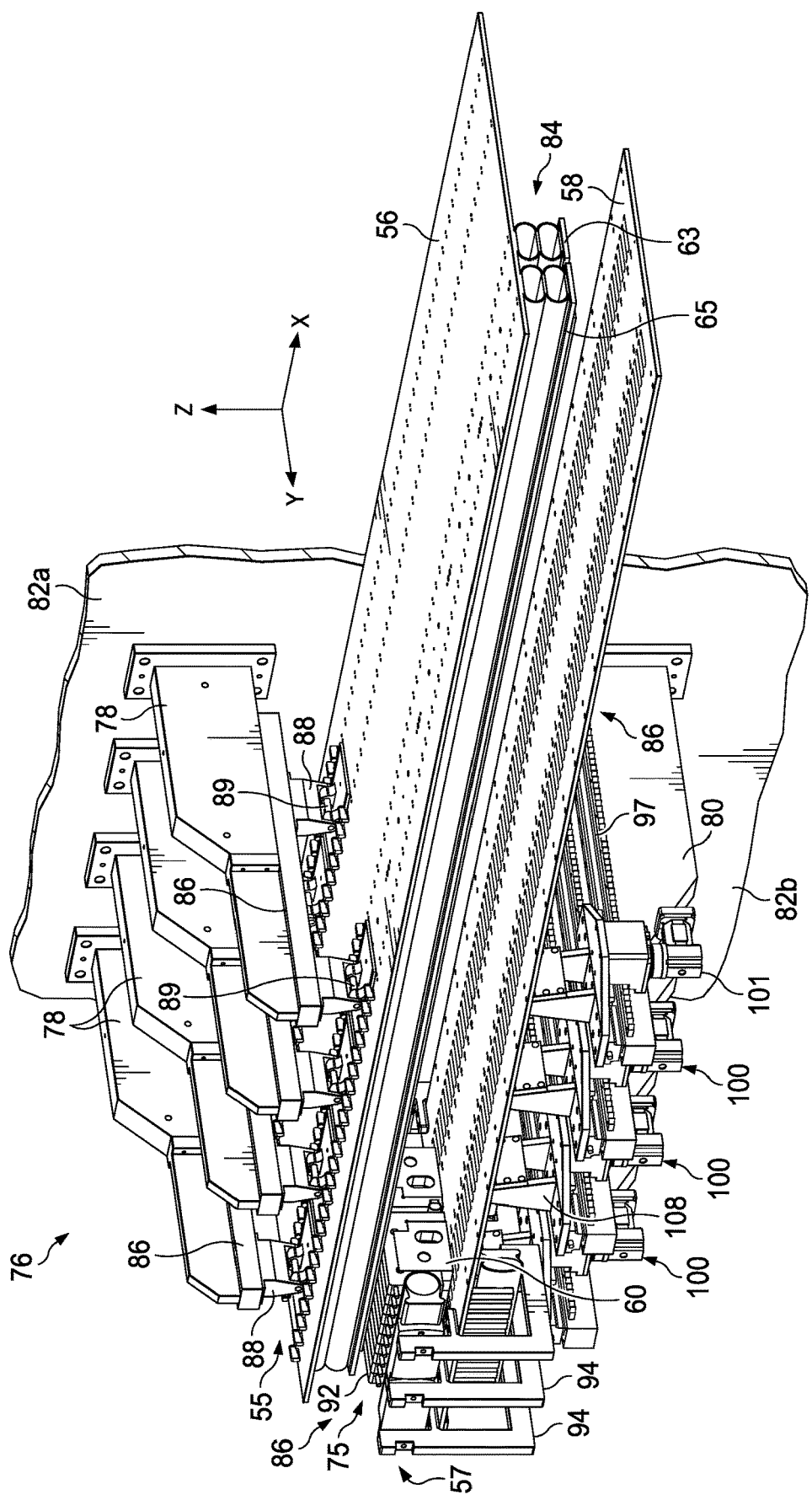
FIGS. 9 and 10 are illustrations of perspective views of the forming apparatus of FIG. 8, certain parts not shown for clarity.
Figure 10:
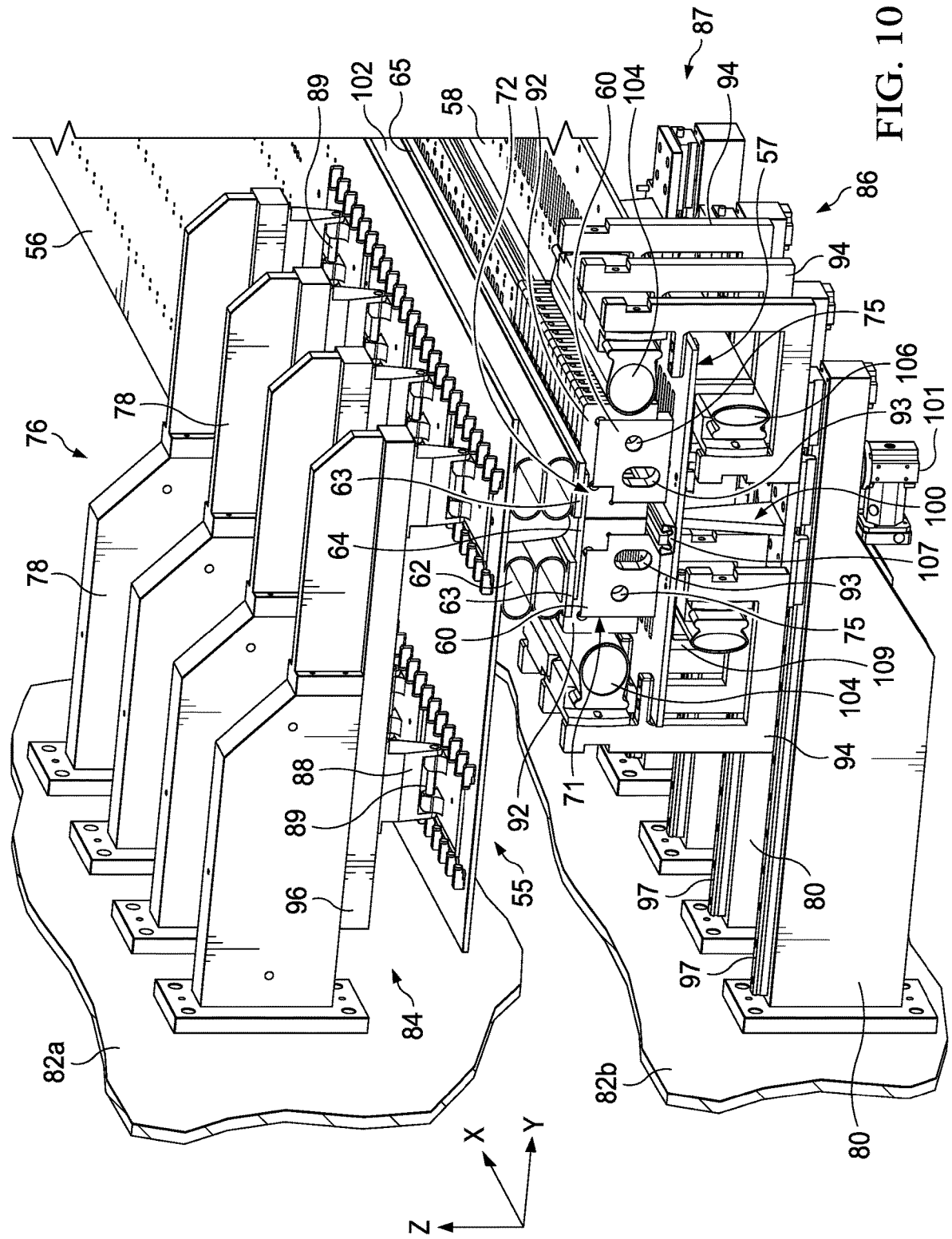
Figure 10A:
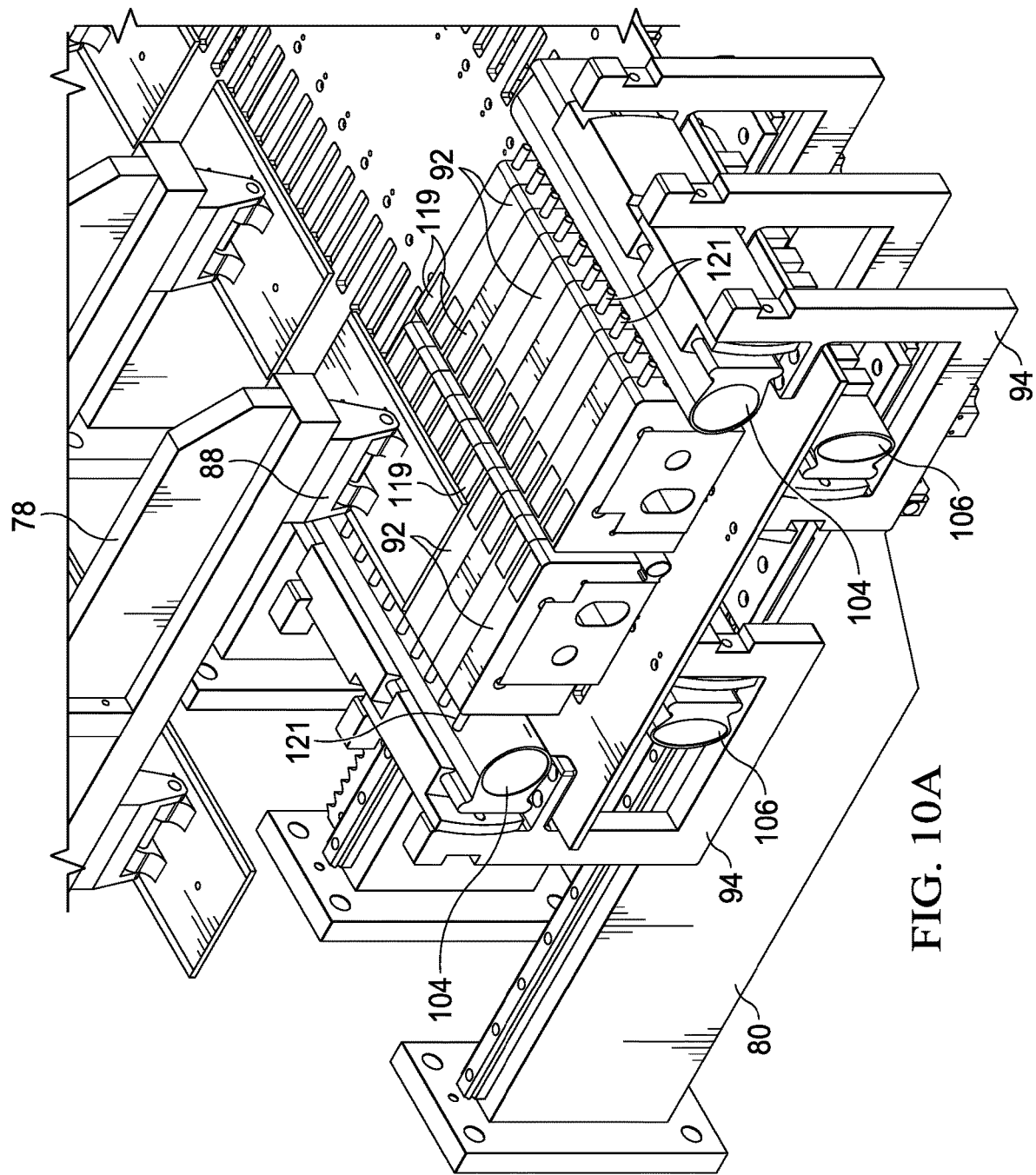
FIG. 10A is an illustration of a perspective view of the lower die, showing a vacuum clamping feature integrated into the die block adapters.

Attention is now directed to FIGS. 5-7 which diagrammatically illustrate a process for forming a flat, muti-ply composite charge 64 into a stringer 44 or similar stiffener of the type previously described. In this example, the stringer 44 being formed is a blade stringer 44, however the principles described below can be used to form any of a variety of other type of stringers. Referring to FIG. 5, a tool set 54 for compression forming the charge 64 into a stringer shape, broadly comprises an upper die 55 and a lower die 57. The upper die 55 comprises a punch 62 attached to a top plate 56, while the lower die 57 comprises a pair of die blocks 60 that are slideable 74 toward and away from each other on a bottom plate 58, and form a die cavity 70. Both the top plate 56 and the bottom plate 58 are formed of a flexible material, such as a flexible metal or a composite, while the die blocks 60 as well as the punch 62 are segmented along their lengths to allow them to flex.

In use, with the upper die 55 in a raised position above the lower die 57, a flat, multiply ply composite charge 64 is placed between the upper die 55 and upper surfaces of the die blocks 60. The top plate 56 is then displaced downwardly with a force F, causing the punch 62 to compression form or "punch" the charge 64 into the die cavity 70, thereby forming a pair of web portions 68. As web portions 68 of the stringer 44 are being formed by the punch 62, flange portions 66 of the stringer 44 are constrained but are allowed to slide between the top plate 56 and the die blocks 60.

Next, as shown in FIG. 6, the top plate 56 is removed and replaced by a flat plate 56a. Then, as shown in FIG. 7, a force F is applied to the flat plate 56a which constraints the flange portions 66, while the die blocks 60 are forced toward each other, causing the web portions 68 to collapse toward each other into a blade 48, while the flange portions 66 are drawn together to form the base 46 of the stringer 44. Finally, the flat plate 56a is removed and the die blocks 60 are drawn apart, allowing the stringer 44 to be removed from the tool set 54. The stringer 44 may be contoured along its length in the XY and/or XZ planes (FIG. 2) by contouring the tool set 54 using appropriate apparatus (not shown).

Attention is now directed to FIGS. 8-10A which illustrate a forming apparatus 76 for forming a flat composite charge 64 into a stringer 44 using a punch forming process similar to that described above in connection with FIGS. 5-7. As will be discussed below in more detail, the forming apparatus 76 is a reconfigurable pallet and end effector employing universal dies that can be readily adapted to form any of a wide variety of stringer shapes with simple modifications that can be easily and quickly performed. The forming apparatus 76 broadly comprises upper and lower supports 82a, 82b that respectively include an upper arm 78 and a lower arm 80. The supports 82a, 82b are coupled with one or more drive mechanisms (not shown) that move the arms 82a, 82b along the Z axis toward and away from each other.

The forming apparatus 76 further comprises an upper tray 84 having an upper die 55, and a lower tray 86 having a lower die 57. The upper tray 84 is connected to the upper arm 78 by a plurality of upper pivots 88 which allow the upper tray 84 to bend as required in the XZ plane (FIG. 2). Each of the upper pivots 88 includes removable pivot pins 89 (FIG. 10) which releasably mount the upper tray 84 on the upper arms 78. The upper tray 84 includes a flexible top plate 56 and a punch 62 which functions similar to punch described earlier in connection with FIGS. 5-7. Although not shown in the Figures, the punch 62 may be segmented along its length to allow it to flex.

The upper tray 84 further includes inflatable clamping hoses 102 that apply pressure to the composite charge 64 through a pair of laterally spaced caul plates 63 positioned on opposite sides of the punch 62. The caul plates 63 function to evenly apply clamping pressure to the composite charge 64, and also act as a heat sink to evenly distribute heat applied to the composite charge 64 by heating blankets 65 interposed between the caul plates and the hoses 104. Referring to FIG. 11A, a vertically aligned pair of the hoses 104, a caul plate 63 and a heating blanket 65 may be arranged as a stacked subassembly 117 on opposite sides of the punch 62. The subassemblies 117 may be attached to the top plate 56 by any suitable means.

Figure 19:
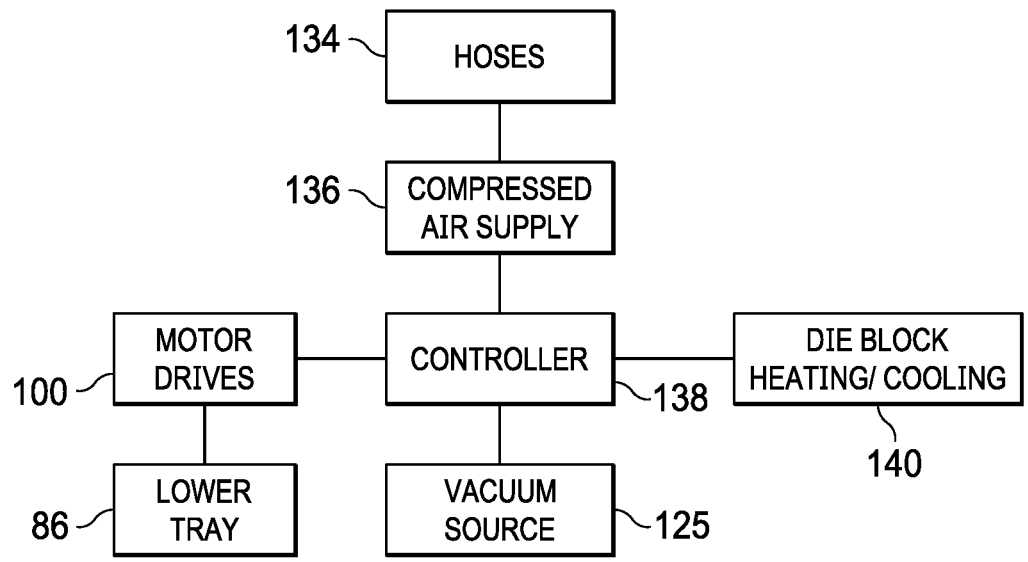
FIG. 19 is an illustration of a block diagram broadly showing the components of a system for controlling operation of the forming apparatus.

The lower tray 86 is pivotally connected to the lower arms 80 by a plurality of lower pivots 90. The lower tray 86 is releasably connected to adapter arms 108 by removable pivot pins 91. The lower tray 86 comprises die block assemblies 71 that are reconfigurable to allow different stringer shapes to be formed. The die block assemblies 71 include a plurality of die blocks 60 slidably mounted on a flexible bottom plate 58. The die block assemblies 71 further comprise a cap assembly 72 which includes die block adapters 98 that cover and are removably mounted on the die blocks 60. The die block adapters 92 have tool surfaces that determine in part, the cross-sectional shape of the stringer 44 being formed. In some applications, depending on the shape of the stringer being formed, it may be desirable to clamp portions of the composite charge, such as the flanges, to the die block adapters 92. Accordingly, the lower die 57 may optionally include a vacuum clamping capability in which the top of each of the die block adapters 92 is provided with one or more air inlet openings 119 that are connected with vacuum ports 121 on the side. The vacuum ports 121 are connected through hoses (not shown) to a vacuum source 125 (FIG. 19) which draws a vacuum at the air inlet openings 119, causing the composite charge 64 to be drawn down and clamped against the tops of the die block adapters 92.

The die blocks 60 include oval shaped cooling passageways 93 which allowing cooling of the die block assemblies 71 either by convection or forced air. The die blocks 60 may be constrained together using rods or cables (both not shown) which pass through circular holes 75 in the die blocks. The circular holes 75 may function to dissipate heat from the die blocks 60. An inflatable block separation hose 107 is positioned between the die blocks 60 and acts as a barrier or stop that maintains a minimum separation distance between the die blocks 60, thus preventing the punch 62 from unintentionally coming into contact with the tops of the die block adapters 92 when upper die 55 is lowered toward the lower die 57 during a forming operation.

Figure 11:
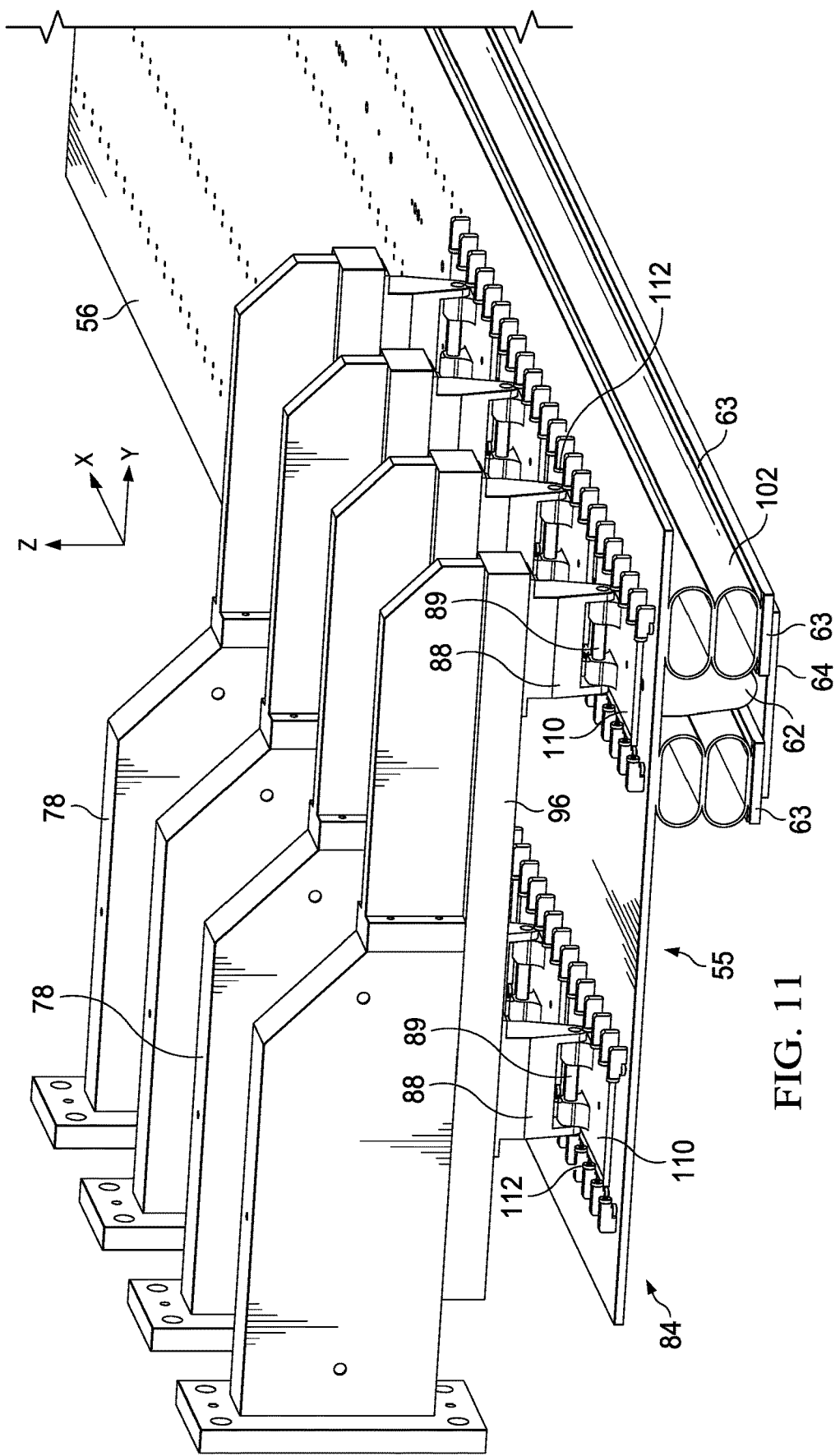
FIG. 11 is an illustration of a perspective view of the upper arms and upper tray.
Figure 11A:
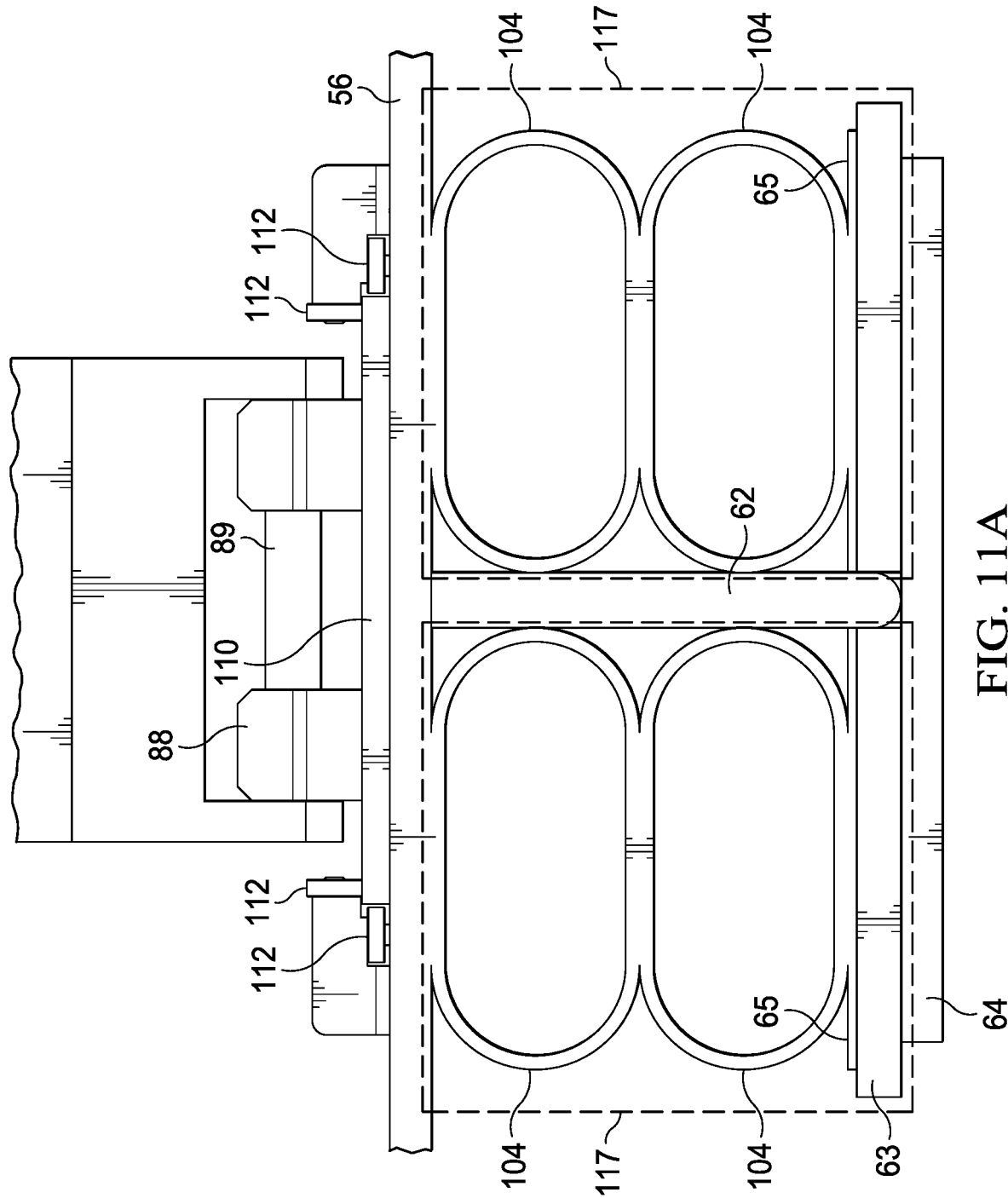
FIG. 11A is an illustration of a front elevational view of a portion of the upper tray including upper die.
Figure 14:
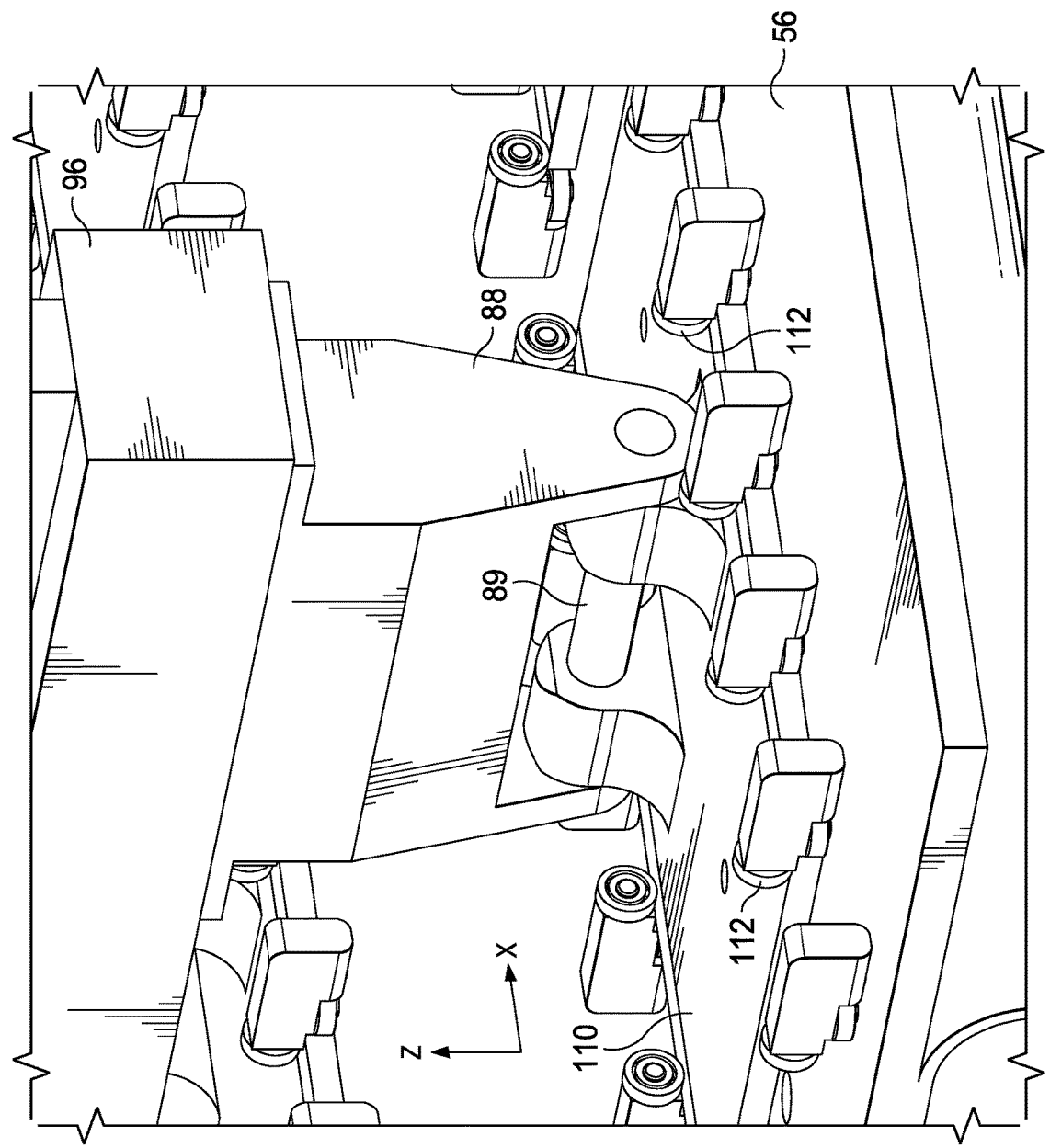
FIG. 14 is an illustration of one of the upper pivots.

Referring to FIGS. 11 and 14, the top plate 56 is formed from a flexible material, such as flexible metal or a flexible composite. An upper pivot plate 110 is secured to the top plate 56 and is pivotally connected to the upper arms 96 through the upper pivots 88. The upper pivot plates 110 are also guided by roller assemblies 112 that allow the upper pivot plates 110 and top plate 56 to move along the X axis relative to the upper arms 96, thus permitting the top plate 56 to flex in the XZ plane as required in order to form the stringer 44 to a desired contour. As will be discussed below, the slideable connection formed between the upper pivot plates 110 and the rollers 112 slideably mounts the top plate 56 on the upper arms 78, thereby allowing the assembly of top plate 56 and the punch 62 to be removed from the forming apparatus 76 by sliding the top plate 56 along the X axis until the upper pivot plate 110 is clear of the rollers 112. Thus, the upper die 55 can be removed and replaced with a differently configured upper die 55 either by removing the pivot pins 89 or by sliding the top plate 56 along the rollers 112.

Figure 12:
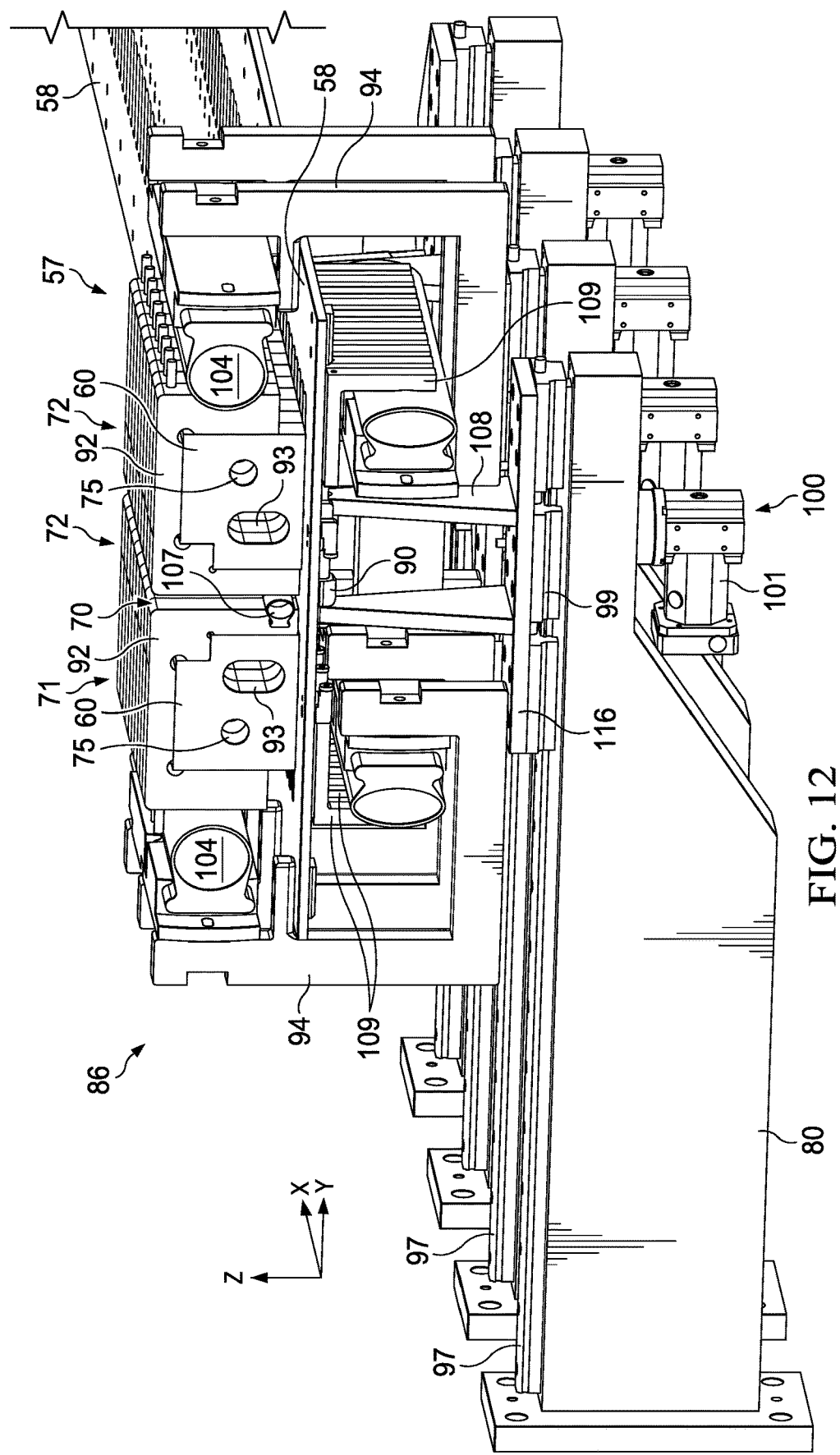
FIG. 12 is an illustration of a perspective view of the lower arms and lower tray.
Figure 13:
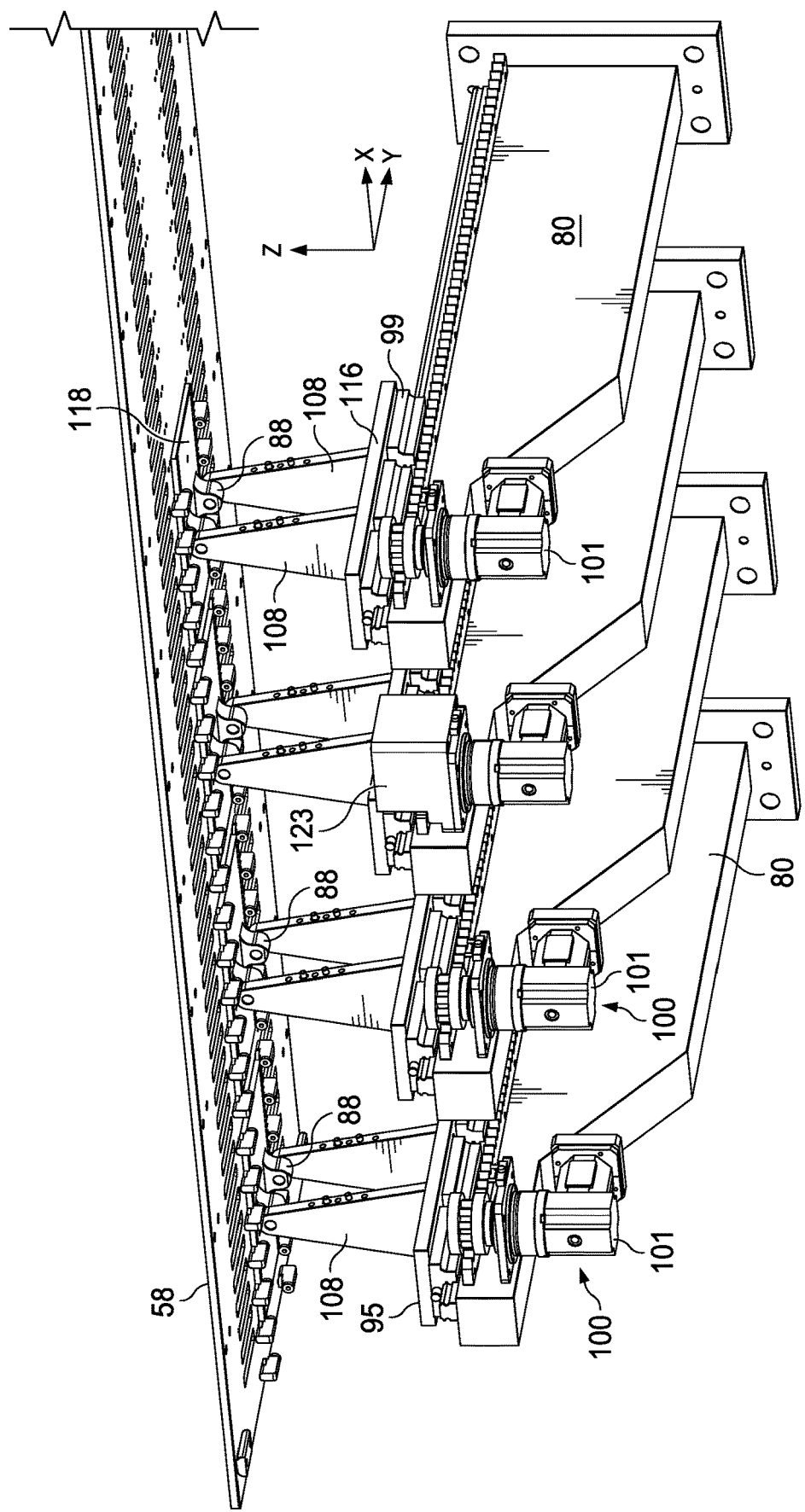
FIG. 13 is an illustration of a perspective view showing how the bottom plate is pivotally mounted to the lower arms.
Figure 15:
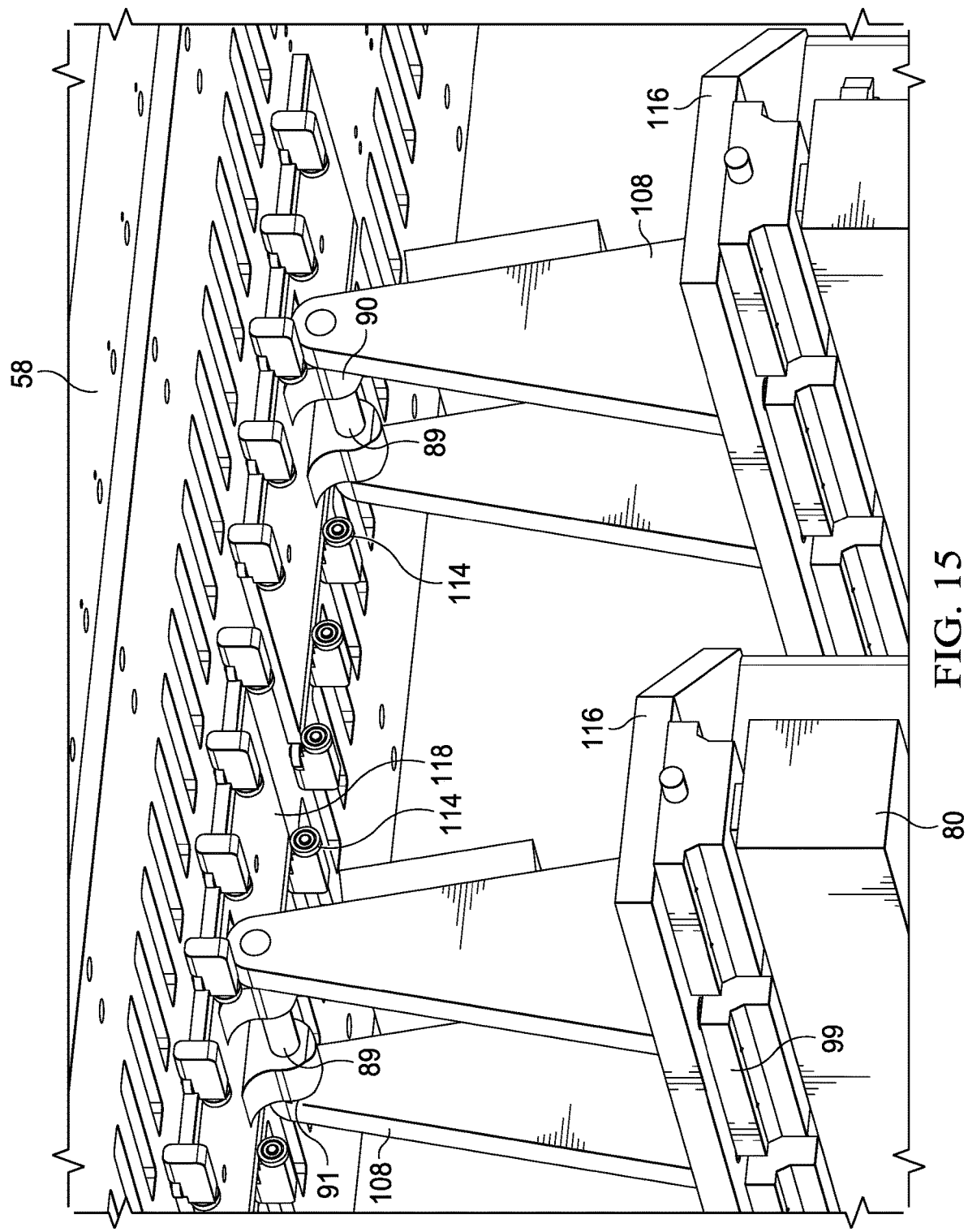
FIG. 15 is an illustration of a perspective view of two of the lower pivots.

Attention is now directed to FIGS. 12, 13 and 15, which illustrate further details of the lower tray 86. Each of the bottom guides 94 and core blocks 60 is secured to a bottom plate 58. The die block adapters 92 are releasably mounted by fasteners such as screws on the die blocks 60 and are spaced apart from each other to form a die cavity 70 into which the composite charge 64 (FIG. 8) is formed by the punch 62. As best seen in FIG. 15, a lower pivot plate 118 is secured to the bottom of the bottom plate 58. Lower pivots 90 pivotally connect the lower pivot plate 118 to the top of adapter arms 108 which are secured to bottom adapter bases 116. The adapter arms 108 are mounted on the bottom adapter base 116. The lower pivot plate 118 is supported on rollers 114, which allow the bottom plate 58 to move along the X direction during contouring of the stringer 44.

Figure 16:
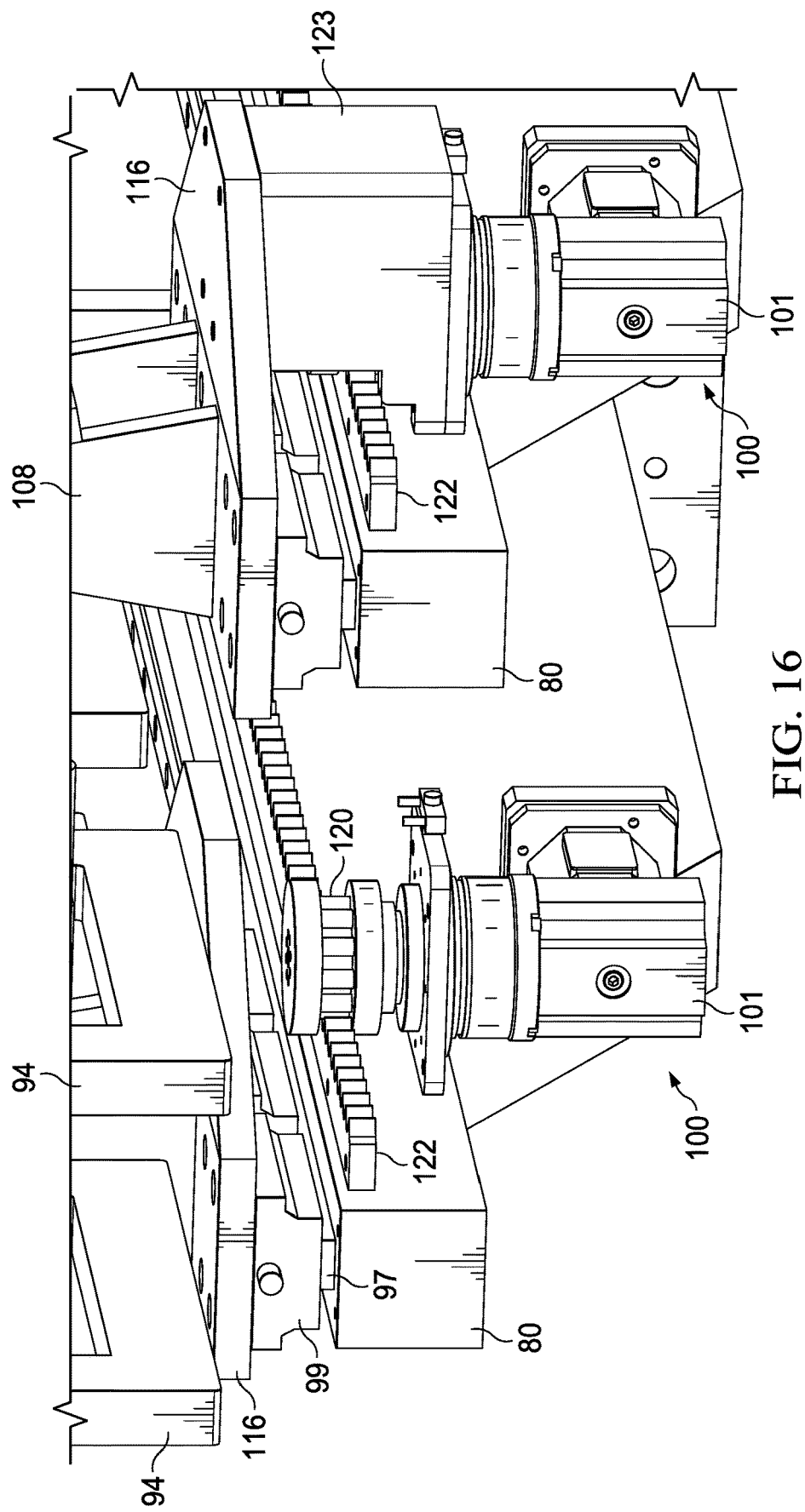
FIG. 16 is an illustration of a perspective view of drive motors, wherein a cover has been removed from one of the drive motors to reveal a pinion gear.

The bottom adapter bases 116 are mounted on linear guides 99 that slide along tray rails 97 on the lower arms 80. The linear guides 99 and tray rails 97 form a slide assembly that allow the lower tray 86 to move along the Y axis between two operating positions discussed below. Referring also to FIG. 16, the lower tray 86 is shifted laterally between these two operating positions by motor drives 100. Each of the motor drives 100 comprises a suitable pneumatic, hydraulic or electric motor 101 driving a pinion gear 120 that engages a toothed rack 122 on one of the lower arms 80. Each of the motors 101 includes a motor housing 123 that is secured to one of the bottom adapter bases 116 by screws (not shown) or other means.

Figure 17:
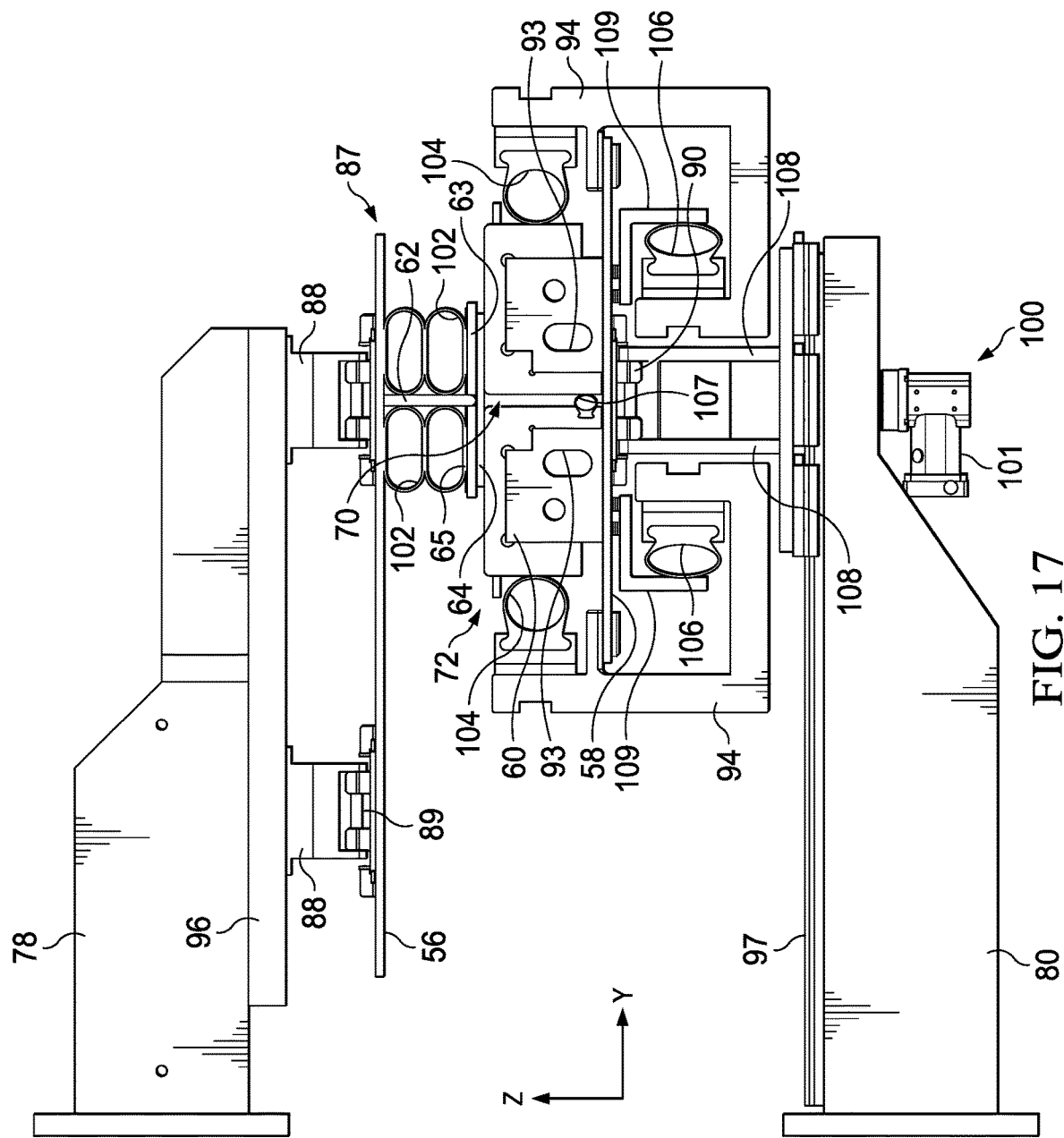
FIG. 17 is an illustration of an end view of the forming apparatus, showing the lower tray in its forming position.

As discussed above, the lower tray 86 can be shifted by the motor drives 100 linearly along the lower arms 80. FIG. 17 shows the lower tray in a punch position 87 at the outer end of the lower arms 80, in which the upper die 55 is aligned above the lower die 57, and more particularly the punch 62 is vertically aligned above the die cavity 70. In this example, the punch 62 is a blade which punches a flat composite charge into the die cavity 70 in a process step similar to that previously described in connection with FIG. 5, in which the upper and lower dies 55, 57 are closed to form a pair of flange portions 66 and web portions 68. After this initial forming step, the upper arms 78 are shifted upwardly, thereby raising the upper tray 84 and withdrawing the punch 62 from the die cavity 70.

Figure 18:
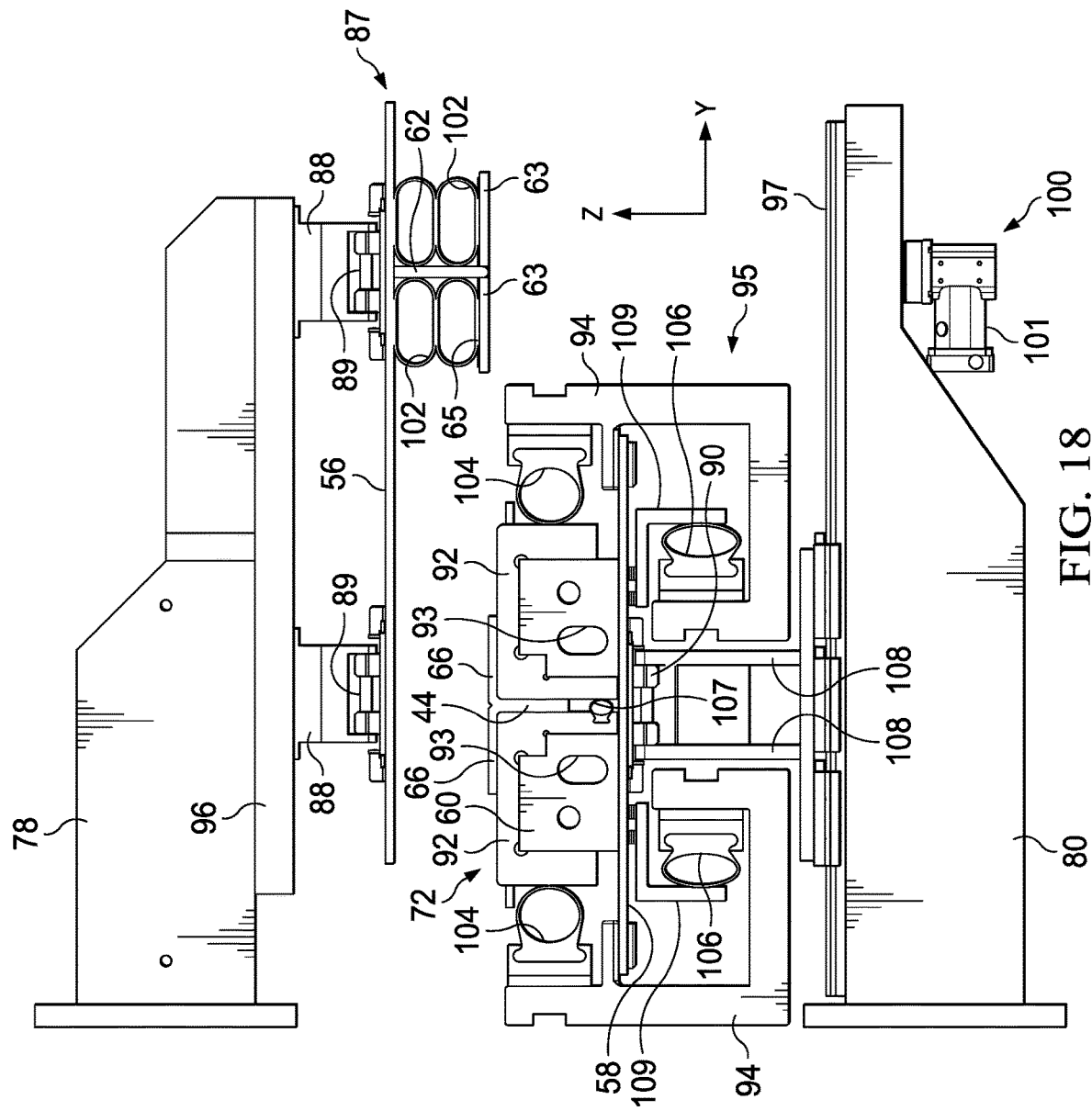
FIG. 18 is an illustration similar to FIG. 17 but showing the lower tray having been laterally shifted to its compaction position.

Referring to FIG. 18, with the upper tray 84 shifted upwardly to withdraw the punch 62 from the die cavity 70, the motor drives 100 are activated, causing the entire lower tray 86 to shift to the left as viewed in FIG. 18, to a compaction position 95 in which the top plate 56 is positioned directly above the die block adapters 92. In the compaction position 95, the upper arms 78 can be lowered to bring the top plate 56 into contact with the flange portions 66 of the composite charge 64, similar to the process previously described in connection with FIG. 6, thereby compacting the flange portions 66.

Various control systems can be used to control operation of the forming apparatus 76. For example, referring to FIG. 19, one suitable control system comprises a controller 138, such as a PC or programmable controller which controls the operation of the motor drives 100, a vacuum source 125, a compressed air supply 136, and a die block heating/cooling system 140.

Referring now to FIGS. 8-10, 17 and 18, in use, the process of forming a flat composite charge 64 into a stringer 44 begins with installing an upper tray 84 having a punch 62 of a desired tool shape, and installing die block adapters 92 of a desired shape on the die blocks 60. The shapes of the punch 62 and the die block adapters 92 determine the cross sectional shape of the stringer 44 to be formed. Next, with the lower tray 86 in the punch position 87 shown in FIG. 17, the upper arms 78 are raised enough to allow a flat composite charge 64 to be placed on the upper surfaces of the die block adapters 92. Hoses 106 are pressurized, causing the die blocks 60 to move apart and form a die cavity 70 of the desired width. Hoses 106 are then depressurized while both hoses 102 and 104 are pressurized at a controlled rate. The upper arms 78 move down, bringing caul plates 53 into contact with and apply a desired amount of pressure to composite charge 64.

Continued downward movement of the upper arms 78 causes the punch 62 to form the composite charge 64 into the die cavity 70, while the flange portions 66 of the charge 64, although restrained, are allowed to slip between the caul plates 63 and the top of the die block adapters 92. The pressure in the hoses 104 is gradually reduced as the punch 62 moves down, permitting the die blocks 60 to move apart as the punch 62 forms the composite charge 64 into the die cavity 70.

Next, the upper arms 78 are displaced upwardly, causing the punch 62 to be withdrawn from the die cavity 70. Then, the motor drives 101 are activated, causing the entire lower tray 86 to move along the Y axis from the punch position 87 shown in FIG. 17 to the compaction position 95 shown in FIG. 18. In the compaction position 95, the lower tray 86 is no longer vertically aligned with the punch 62 but and instead is vertically aligned with the top plate 56. The upper arms 78a are again displaced downwardly until the top plate 56 comes in contact with the flange portions 66 of the partially formed charge 64. While the top plate 56 applies compaction pressure to the flange portions 66, the pressure in the hoses 104 is increased, causing the die blocks 60 and cap assemblies 72 to move toward each other which squeeze and collapse the web portions 68 of the composite charge 64, similar to the process step described earlier in connection with FIG. 7. In those examples where the stringer 44 is to be contoured along its length (see FIG. 2), a die changing mechanism (not shown) bends the punch 62 as well as the die blocks 60 and cap assembly 72, thereby forming the stringer 44 to the desired contour. The stringer 44 having been fully formed and compacted, hoses 104 are deflated, upper arms 78 raise the upper tray 84, and hoses 106 are inflated which cause the die blocks 60 and cap assemblies 72 to move away from each other and allow the stringer 44 to be removed from the forming apparatus 76.

Figure 20:
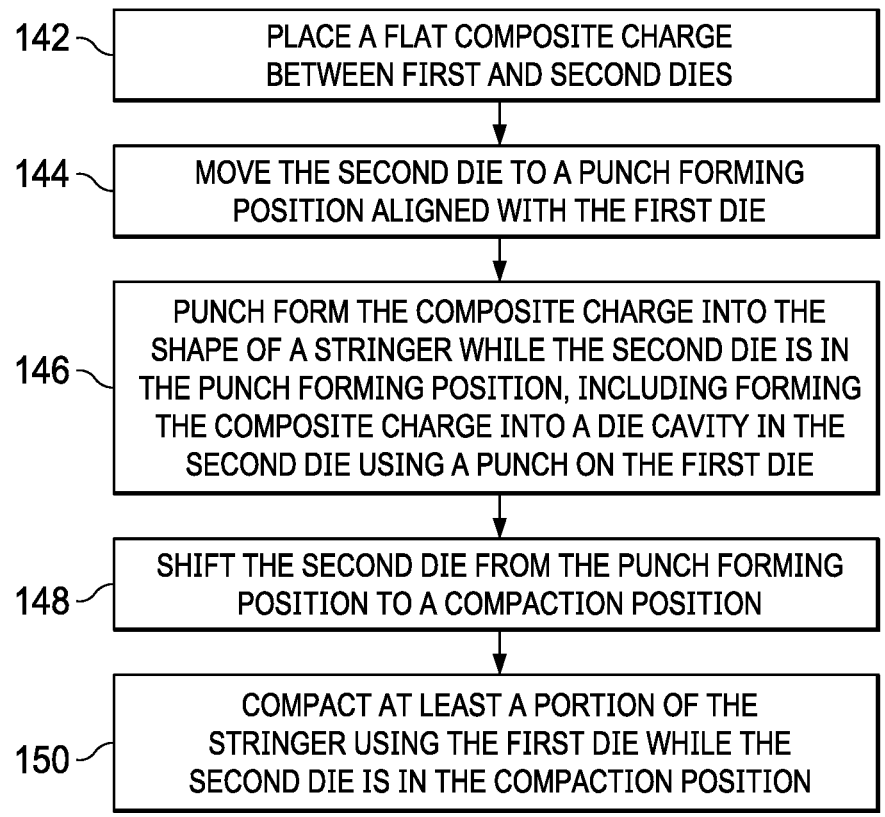
FIG. 20 is an illustration of a flow diagram of a method of making a stringer.

Attention is now directed to FIG. 20 which broadly illustrates the steps of a method of making a composite stringer 44 which can be carried out using the forming apparatus 76 previously described. Beginning at 142, a flat composite charge 64 is placed between first and second dies 55, 57. At 144, the second die 57 is moved to a punch forming position 87 aligned with the first die 55. At 146, the composite charge 64 is punch formed into the shape of a stringer 44 while the second die 57 is in the punch forming position 87. The composite charge 64 is formed into a die cavity 70 in the second die 57 using a punch 62 on the first die. At 148, the second die 57 is shifted from the punch forming position 87 to a compaction position 95. At 150, at least a portion 68 of the stringer 44 is compacted using the first die 55 while the second die 57 is in the compaction position 95.

Figure 21:
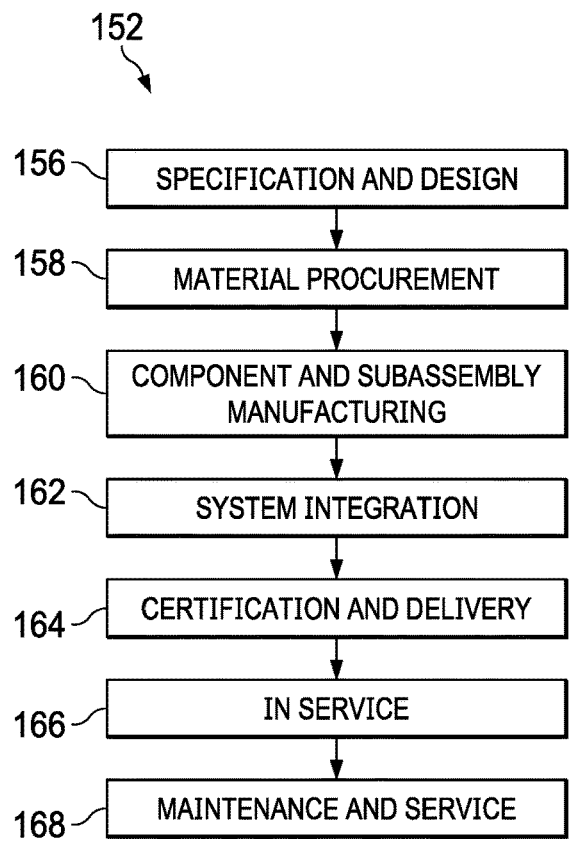
FIG. 21 is an illustration of a flow diagram of aircraft production and service methodology.
Figure 22:
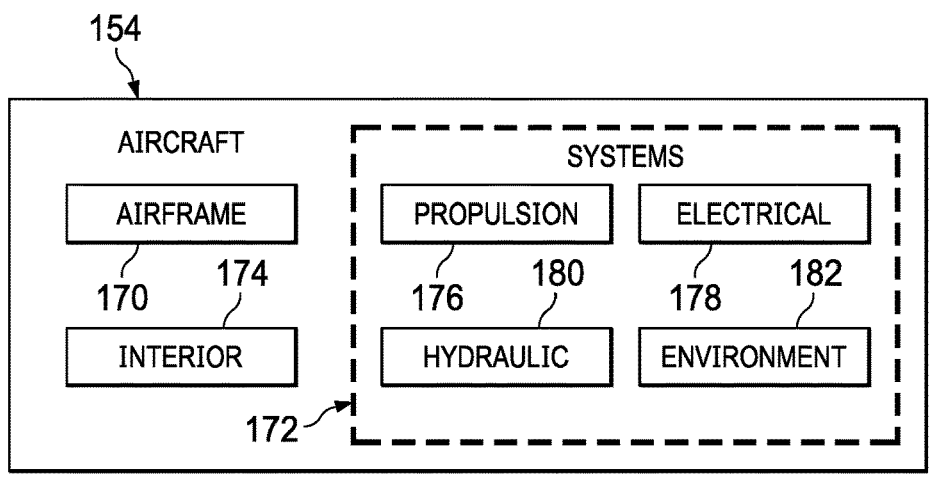
FIG. 22 is an illustration of a block diagram of an aircraft.

Examples of the disclosure may find use in a variety of potential applications, particularly in the transportation industry, including for example, aerospace, marine, and other application where composite stiffeners such as composite laminate stringers for aircraft, may be used. Thus, referring now to FIGS. 21 and 22, examples of the disclosure may be used in the context of an aircraft manufacturing and service method 152 as shown in FIG. 21 and an aircraft 154 as shown in FIG. 22. Aircraft applications of the disclosed examples may include a variety of composite stringers of various cross sectional shapes, including those that are that have contours, curvatures, varying thicknesses or other non-uniformities along their lengths. During pre-production, exemplary method 152 may include specification and design 156 of the aircraft 154 and material procurement 158. During production, component and subassembly manufacturing 160 and system integration 162 of the aircraft 154 takes place. Thereafter, the aircraft 154 may go through certification and delivery 164 in order to be placed in service 166. While in service by a customer, the aircraft 154 is scheduled for routine maintenance and service 168, which may also include modification, reconfiguration, refurbishment, and so on.

Each of the processes of method 152 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 22, the aircraft 154 produced by exemplary method 152 may include an airframe 170 with a plurality of systems 172 and an interior 174. Examples of high-level systems 172 include one or more of a propulsion system 176, an electrical system 178, a hydraulic system 180 and an environmental system 182. Any number of other systems may be included. Although an aerospace example is shown, the principles of the disclosure may be applied to other industries, such as the marine and automotive industries.

Systems and methods embodied herein may be employed during any one or more of the stages of the aircraft manufacturing and service method 152. For example, components or subassemblies corresponding to production process 160 may be fabricated or manufactured in a manner similar to components or subassemblies produced while the aircraft 154 is in service. Also, one or more apparatus examples, method examples, or a combination thereof may be utilized during the production processes 160 and 162, for example, by substantially expediting assembly of or reducing the cost of an aircraft 154. Similarly, one or more of apparatus examples, method examples, or a combination thereof may be utilized while the aircraft 154 is in service, for example and without limitation, to maintenance and service 168.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different advantages as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A pallet for forming composite stringers, comprising:
an upper support including upper arms;
an upper die including a punch, the upper die including an upper tray having a top plate, wherein the punch is mounted on the top plate, the upper die including a number of inflatable clamping hoses coupled to the top plate and a number of caul plates coupled to the number of inflatable clamping hoses;
a lower support including lower arms, the upper and lower supports being configured to move toward and away from each other; and
a lower die mounted on the lower support, the lower die including die block assemblies forming a die cavity into which a composite charge may be formed by the punch, the lower die including a lower tray having the die block assemblies mounted thereon.

2. The pallet of claim 1, wherein:
the die block assemblies are reconfigurable to allow different stringer shapes to be formed.

3. The pallet of claim 2, further comprising:
slideable connections mounting the upper tray for sliding movement on the upper arms and configured to allow the upper tray to be released from the upper arms and replaced by a differently configured upper tray.

4. The pallet of claim 1, wherein the lower tray is slideably mounted on the lower arms for movement between a stringer forming position and a stringer compaction position.

5. The pallet of claim 4, further comprising:
motor drives carried on the lower arms and configured to drive the lower tray along the lower arms between the stringer forming position and the stringer compaction position.

6. The pallet of claim 5, wherein there are four upper arms and there are four lower arms.

7. The pallet of claim 1, wherein the die block assemblies include:
die blocks shiftable toward and away from each other, and
die block adapters removably mounted on the die blocks and configured to allow the lower die to be reconfigured to form stringers having different shapes.

8. The pallet of claim 1, wherein there are four upper arms and there are four lower arms.

9. The reconfigurable pallet of claim 8, wherein the die block assemblies include:
die blocks shiftable toward and away from each other, and
die block adapters removably mounted on the die blocks and configured to allow the lower die to be reconfigured to form stringers having different shapes.

10. A reconfigurable pallet for forming composite stringers having different shapes, comprising:
an upper support including upper arms;
an upper die including a punch, the upper die being releasably mounted on the upper support and configured to allow the upper die to be replaced with a different upper die, the upper die including an upper tray having a top plate, wherein the punch is mounted on the top plate, the upper die including a number of inflatable clamping hoses coupled to the top plate and a number of caul plates coupled to the number of inflatable clamping hoses;
a lower support including lower arms, the upper and lower supports being configured to move toward and away from each other; and
a lower die mounted on the lower support, the lower die including die block assemblies forming a die cavity into which a composite charge may be formed by the punch, the lower die including a lower tray having the die block assemblies mounted thereon.

11. The reconfigurable pallet of claim 10, wherein:
the die block assemblies are reconfigurable to allow different stringer shapes to be formed.

12. The reconfigurable pallet of claim 11, further comprising:
upper pivots pivotally mounting the top plate on the upper arms, the upper pivots including removable pivot pins allowing the top plate to be removed from the upper arms.

13. The reconfigurable pallet of claim 10, further comprising:
lower pivots pivotally mounting the lower tray on the lower arms, the lower pivots including removable pivot pins allowing the lower tray to be removed from the lower arms.

14. The reconfigurable pallet of claim 10, further comprising:
motor drives carried on the lower arms and configured to drive the lower tray along the lower arms between a stringer forming position and a stringer compaction position.

15. The reconfigurable pallet of claim 14, wherein there are four upper arms and there are four lower arms.

16. The reconfigurable pallet of claim 10, wherein the die block assemblies include:
die blocks shiftable toward and away from each other, and
die block adapters removably mounted on the die blocks and configured to allow the lower die to be reconfigured to form stringers having different shapes.

17. The reconfigurable pallet of claim 10, wherein there are four upper arms and there are four lower arms.

18. The reconfigurable pallet of claim 17, wherein the die block assemblies include:
die blocks shiftable toward and away from each other, and
die block adapters removably mounted on the die blocks and configured to allow the lower die to be reconfigured to form stringers having different shapes.

19. A reconfigurable pallet for forming composite stringers having different shapes, comprising:
an upper support including upper arms;
an upper die including a punch, the upper die being releasably mounted on the upper support and configured to allow the upper die to be replaced with a different upper die, the upper die including an upper tray having a top plate, wherein the punch is mounted on the top plate, the upper die including a number of inflatable clamping hoses coupled to the top plate and a number of caul plates coupled to the number of inflatable clamping hoses;
a lower support including lower arms, the upper and lower supports being configured to move toward and away from each other; and
a lower die mounted on the lower support, the lower die including die block assemblies forming a die cavity into which a composite charge may be formed by the punch, the lower die including a number of hoses coupled to the die block assemblies, wherein the number of hoses move the die block assemblies when the number of hoses are pressurized or depressurized, the lower die including a lower tray having the die block assemblies mounted thereon.

20. The reconfigurable pallet of claim 19, wherein:
the die block assemblies are reconfigurable to allow different stringer shapes to be formed.

21. The reconfigurable pallet of claim 19, further comprising:
   motor drives carried on the lower arms and configured to drive the lower tray along the lower arms between a stringer forming position and a stringer compaction position.

22. The reconfigurable pallet of claim 21, wherein there are four upper arms and there are four lower arms.

23. The reconfigurable pallet of claim 19, wherein the die block assemblies include:
   die blocks shiftable toward and away from each other, and
   die block adapters removably mounted on the die blocks and configured to allow the lower die to be reconfigured to form stringers having different shapes.

24. The reconfigurable pallet of claim 19, wherein there are four upper arms and there are four lower arms.

25. The reconfigurable pallet of claim 24, wherein the die block assemblies include:
   die blocks shiftable toward and away from each other, and
   die block adapters removably mounted on the die blocks and configured to allow the lower die to be reconfigured to form stringers having different shapes.

* * * * *